Nov. 1, 1960

H. W. PALKOWSKI 2,958,263

VANE GENERATING MACHINE

Filed Dec. 10, 1957

INVENTOR.
Henry W. Palkowski

By John J. Matlago
Attorney.

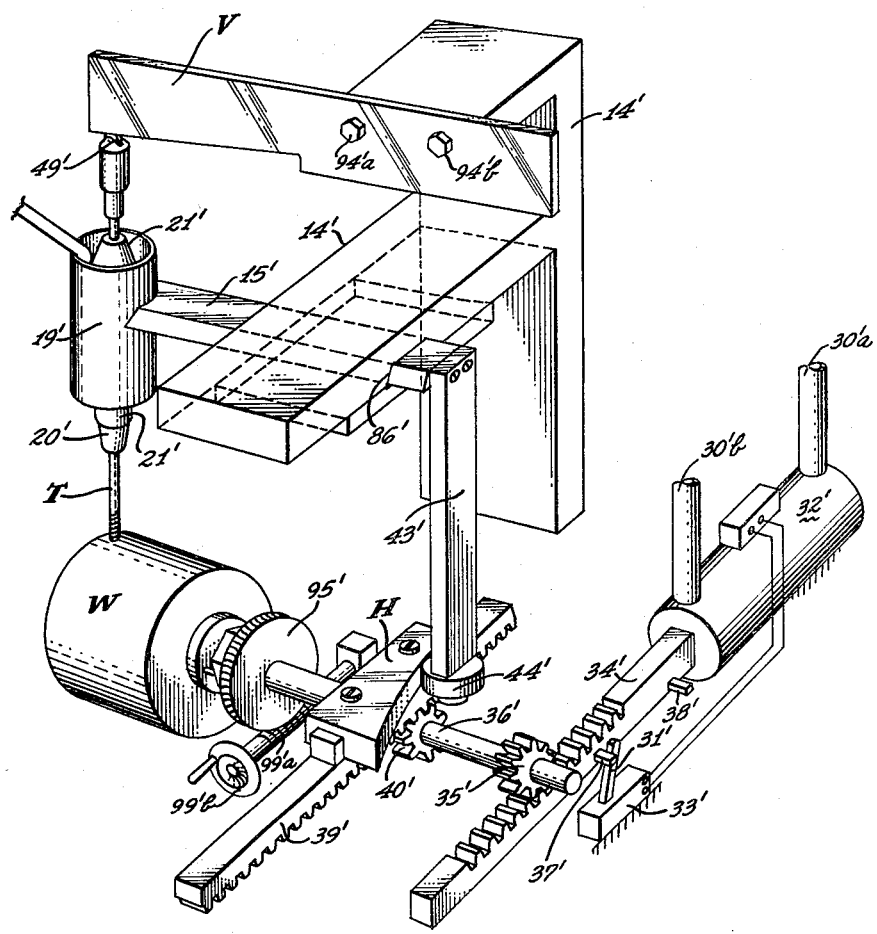

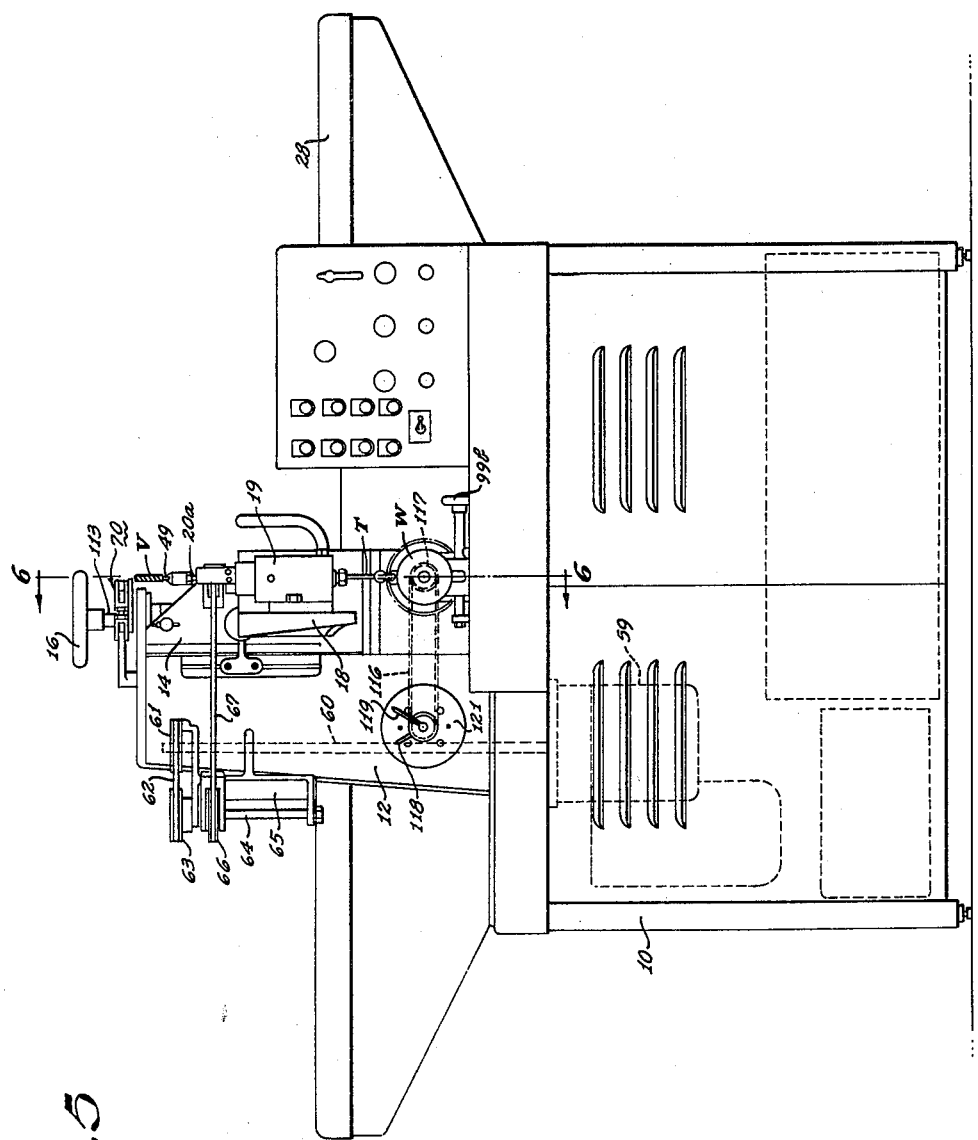

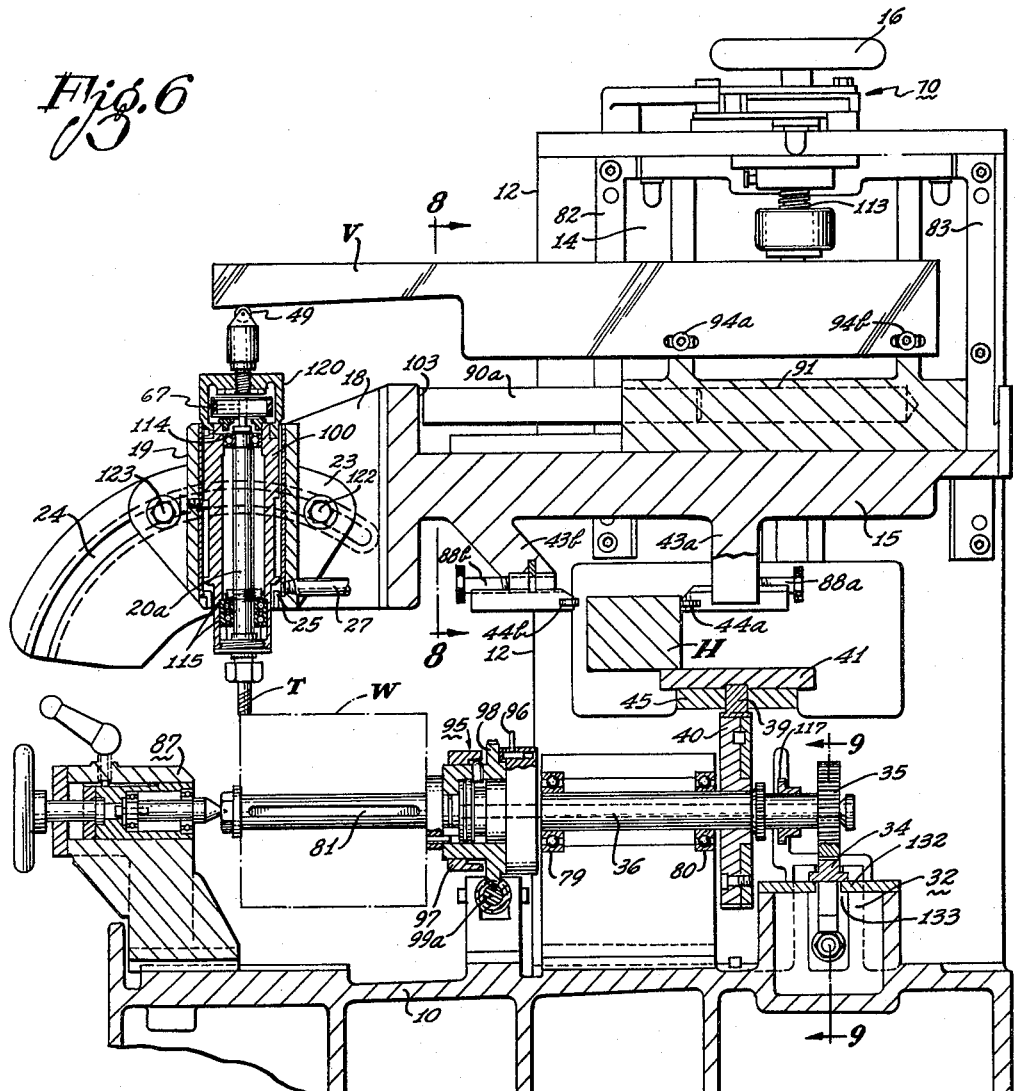
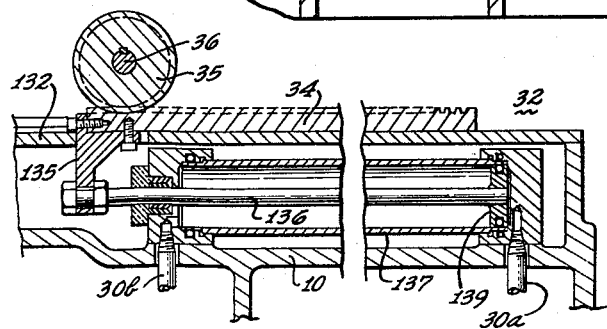

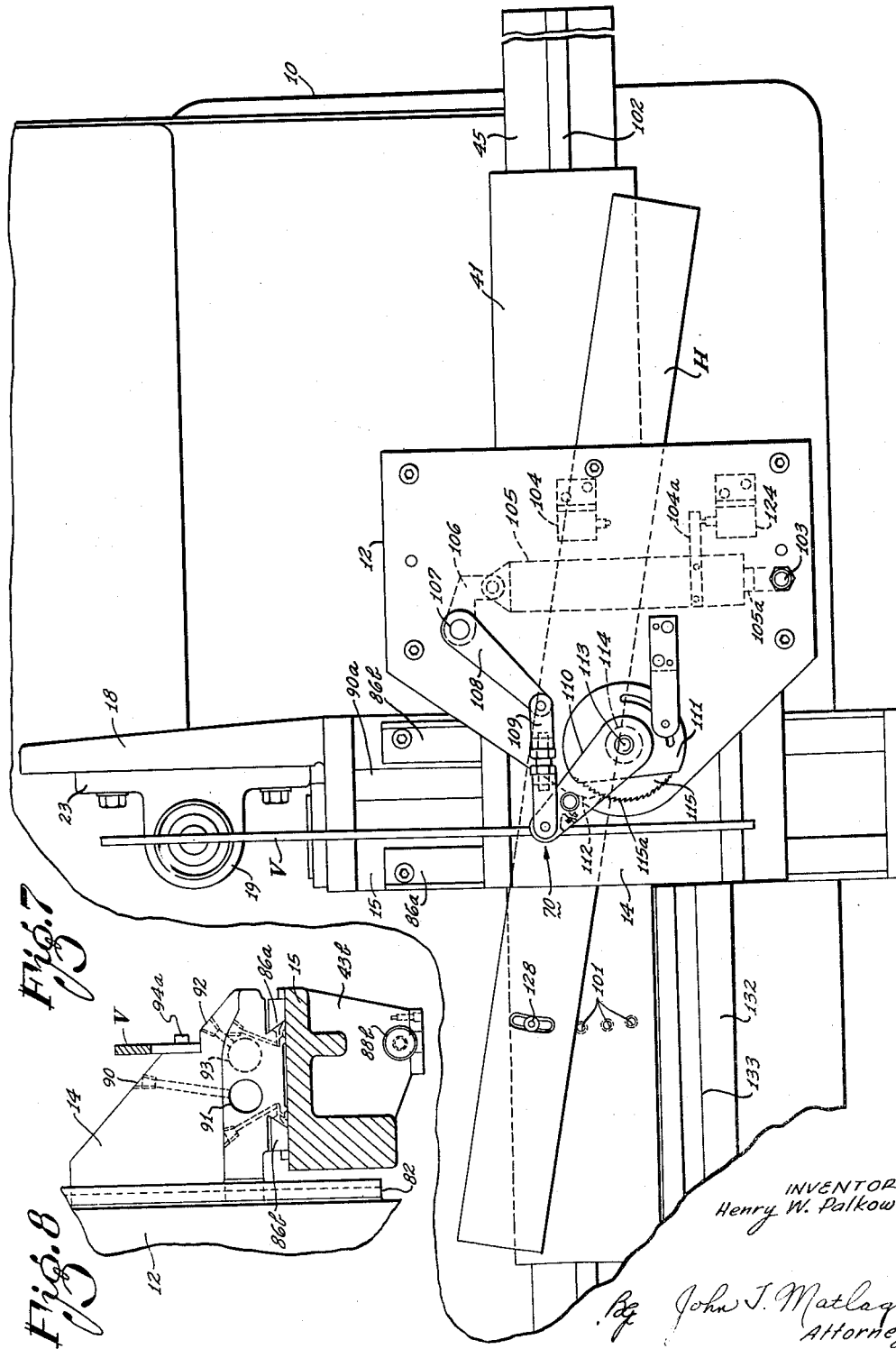

United States Patent Office 2,958,263
Patented Nov. 1, 1960

2,958,263

VANE GENERATING MACHINE

Henry W. Palkowski, Los Angeles, Calif.
(27441 Rainbow Ridge Road, Rolling Hills, Calif.)

Filed Dec. 10, 1957, Ser. No. 701,762

2 Claims. (Cl. 90—13)

This invention relates to machine tools and more particularly to vane generating machines suitable for machining vane or blade components on fluid pumps and similar rotating equipment.

Adapting and controlling conventional machine tools to generate, i.e., machine, impellers and similar type articles having helically disposed blades results in complex drives and unnecessary interconnections which complicate the machining process and do not readily lend themselves to quantity production uses. Hence it is highly desirable to provide a specially designed vane generating machine which can simply control the path of the cutting head relative to the rotating workpiece so as to automatically form the impeller from a generally cylindrical piece of stock. In addition it is highly desirable for production purposes to be able to easily change the setup of an impeller generating machine so that any shape of the blades for an impeller can be generated.

Accordingly, one of the objects of this invention is to provide a novel cam drive arrangement for simply controlling the movement of a cutter relative to the axis and radius of a rotating workpiece.

Another object of this invention is to provide an impeller generating means which is highly versatile in its ability to produce a variety of blade configurations in accordance with the contour of a pair of readily changeable cams operable to control and coordinate the movements of a cutter relative to a workpiece.

Other objects and advantages of the invention will become apparent to those skilled in the art from the following detailed description of the accompanying sheets of drawings which, by way of example only, illustrate the preferred embodiment of the invention.

In the drawings:

Fig. 4 is a simplified schematic perspective view of the invention, with parts omitted for clarity, showing the arrangements of the driving elements for obtaining the various coordinated relative movements of the cutter and workpiece.

Fig. 5 is a front elevation view of the machine of the present invention.

Fig. 6 is a vertical transverse sectional view taken substantially along the section line 6—6 of Fig. 5.

Fig. 7 is a top plan view of the machine.

Fig. 8 is a vertical sectional view of the sub-carriage taken along the section line 8—8 of Fig. 6.

Fig. 9 is a vertical sectional view of the driving mechanism taken substantially along the section line 9—9 of Fig. 6.

Figure 1:
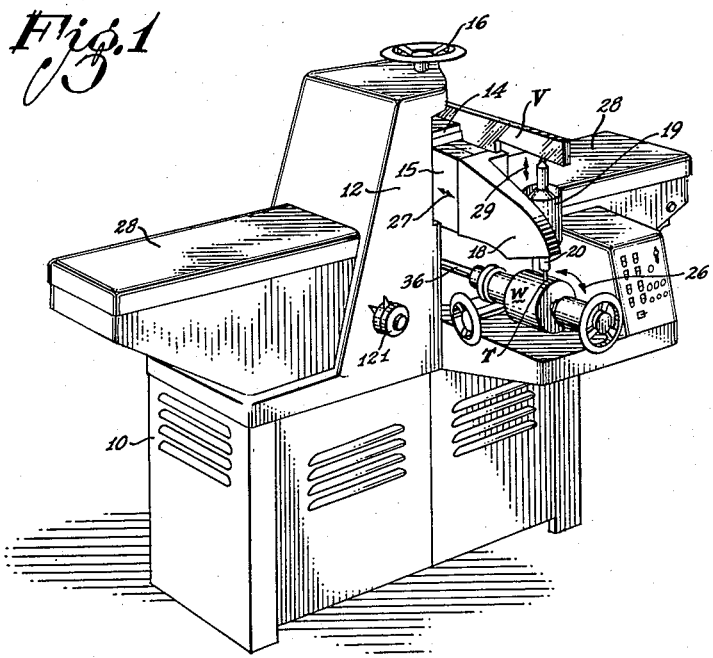
Fig. 1 is a perspective view of the machine.

Referring to Fig. 1, the machine of the present invention is shown to comprise a bed frame 10 having a pedestal 12 rigidly mounted thereon in any suitable manner. On the right side of pedestal 12, a carriage 14 is mounted for movements in a vertical direction by handwheel 16 or automatic means to be described subsequently. Mounted on the underside of carriage 14 so as to have a horizontal or transverse movement relative thereto is a sub-carriage 15 having an extension 18 on the outer end thereof for supporting a cutter housing 19. Rotated within housing 19 is a drive spindle 20 for a cutter T. A generally cylindrical workpiece W is mounted on a drive shaft or working spindle 36 supported on bed frame 10 for rotation on a horizontal axis located parallel to the movement of sub-carriage 15. Provided within the covers 28 located on the top of the bed frame 10 is a hydraulic reciprocating driving mechanism (Fig. 9) which imparts an oscillatory motion, as indicated by arrows 26, of up to two revolutions in one direction and then the other, to the work spindle 36 and hence the workpiece W. As the work spindle 36 is thus rotated, it imparts a driving force, by way of a cam arrangement to be subsequently described, onto sub-carriage 15 causing it to move back and forth along a horizontal path, indicated by arrows 27, transverse to the carriage 14. As the sub-carriage 15 moves horizontally, the drive spindle 20 is controlled to move up and down within housing 19 along a vertical path, indicated by arrows 29, in accordance with the contour of the controlling surface of a vertical cam V.

The cam driving arrangement of the present invention can be understood by referring to Fig. 4 showing a simplified schematic perspective view of the moving elements for coordinating the various relative movements of the workpiece W and the cutter T. As shown, a drive rack 34' is driven back and forth by a hydraulic driving mechanism 32' which operates to reverse its motion in accordance with the triggering of limit switch 33' by stops 37' and 38' provided on rack 34'. Assuming drive rack 34' is moving into hydraulic driving mechanism 32' such that stop 37' hits arm 31' of limit switch 33', this causes the valve in line 30a' to open and the valve in line 30b' to close. As a result of this action, the drive rack 34' moves out of the mechanism 32' until stop 38' hits arm 31' and reverses the condition of the valves. This drive rack 34' engages a pinion 35' on shaft or work spindle 36', thereby causing work spindle 36' and cylindrical workpiece W connected thereto, to rotate. Intermediate the ends of shaft 36' is mounted a second pinion 40' which in turn drives a cam rack 39' having a horizontal control cam H rigidly attached thereon. A follower 44' for cam H is attached by a support 43' to one end of a sub-carriage 15' which latter is mounted to slidably engage the V grooves 86, provided in a carriage 14'. On the other end of sub-carriage 15' is attached housing 19'. Located within housing 19' is a pneumatically floated sleeve member 21' having attached to its upper end a cam follower 49'. Rotatably supported within member 21' and extending out of the lower end thereof is the drive spindle 20'. An air or electrical motor, not shown, may be included in the housing 19' for rotating spindle 20'. It should now be clear that cam follower 49' may be urged, by air pressure exerted on the sleeve member 21', to follow the contoured surface of a vertical control cam V attached to carriage 14' by screws 94a' and 94b'.

Referring back to the horizontal control cam H, as the drive rack 34' is driven back and forth, the workpiece W rotates about its fixed axis and the cam rack 39' is driven along a path perpendicular to this axis, thereby causing cam H, in accordance with the contour of its controlling surface, to exert a force on the follower 44'. This, in turn, causes the sub-carriage 15' to slide along the V groove 86' of carriage 14' and consequently moves housing 19' attached to the end thereof. This movement is in the direction parallel to the rotating axis of workpiece W and is controlled in accordance with the position of cam follower 44' on the contoured surface of horizontal control cam H. In a similar manner, as the cutter T moves along the axis of the workpiece W, its vertical position is determined in accordance with the position of cam follower 49' on vertical control cam V. It should be understood that a hydraulic unit (not shown) may be provided for applying a bias force on sub-carriage 15' to cause follower 44' to always contact the contoured surface of cam H, thereby eliminating any back lash in this mechanism.

In addition to controlling the movement of the cutter T along the axis and radius of workpiece W by means of cams H and V respectively, provision is made, as to be subsequently described in the details of the preferred embodiment, for vertically moving the carriage 14' which has the cam V rigidly attached thereto, thereby providing for feeding the cutter T into the workpiece W on successive passes of the cutter T over the workpiece W. The contoured surface of cam H must be of sufficient height to enable follower 44' to ride on this surface for the full vertical movement required of carriage 14'.

It should now be generally understood that the invention provides a mehcanism for generating vanes by causing the rotating motion provided for the workpiece W to control the linear movement of a cam H, thereby directly imparting a horizontal movement of the cutter T along the fixed rotating axis of the workpiece W. In addition, as this axial movement is imparted to the cutter T, a vertical movement, a radial movement relative to the rotating axis of workpiece W, is imparted by cam V to the cutter T.

Figure 2:
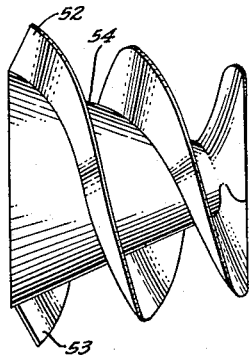
Fig. 2 shows the form of an impeller which may be generated by the machine of the present invention.
Figure 3:
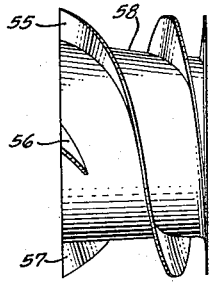
Fig. 3 shows another form of an impeller which may be generated by the machine of the present invention.

The movement of the cutter T relative to the workpiece W can be further understood by reference to Figs. 2 and 3 which show forms of the impellers which may be generated by the present invention. Thus the impeller in Fig. 2 is seen to comprise two successive circumferentially spaced helically disposed vanes 52 and 53. The hub portion 54 of the impeller is seen to be conical in form and it should be noted that the side surfaces of the vanes 52 and 53 are generated so as to be perpendicular to the hub. Fig. 3 shows a different form of an impeller having four blades, each spaced substantially 90 degrees about the circumference, such as the blades 55, 56, and 57 visible in the view shown. These blades have a different helix angle than the blades of the impeller in Fig. 2, and furthermore, the variation in the diameter of the hub portion 58 is noticeably less. It will be obvious from the ensuing descriptions that the contour of the controlling surfaces of the cams H and V can be designed and their action so coordinated with the rotating motion of the workpiece W that any desired contour can be machined for the vanes and hubs on the impeller. Thus, by use of the present invention, impellers can be generated with vanes or blades having straight or tapered sides, convex or concave shapes, and constant or variable lead angles. Vanes can be generated up to 720° or more, and may be perpendicular to the axis or the hub. In addition, the hubs of the impellers can be machined with either concave or convex contours.

Referring next to Fig. 5, there is shown a front elevation view of a preferred embodiment of the invention providing a mechanical drive spindle 20a. Thus a motor 59 indicated as located in the upper portion of bed frame 10 drives a motor shaft 60 supported in bearings (not shown) mounted in the pedestal 12. This shaft 60 drives a pulley 61 which is connected by a belt 62 to drive a pulley 63 on a second shaft 64 mounted to rotate in a bracket 65 attached to the side of pedestal 12. This latter shaft 64 is provided with a pulley 66 and belt 67 which rotates the spindle 20a having the cutter T positioned on the end thereof. In addition this embodiment shows a mechanism 70 located on the top of the pedestal 12 for automatically feeding the cutter T radially into the workpiece W on each pass of the cutter over the workpiece, in a manner to be described in the ensuing description. The preferred form and arrangement of the mechanism for imparting the coordinated relative movements to the cutter T and workpiece W may be understood by reference to Fig. 6 which is a sectional view taken at 6—6 of Fig. 5. Thus in Fig. 6, a hydraulic driving mechanism 32 (Fig. 9) drives rack 34 which slides on either side of an opening 133 provided on a lengthwise support 132 attached to the bed frame 10. As seen in Fig. 9, which is a sectional view taken at 9—9 of Fig. 6, the top of a bracket 135 is attached to the front end of the drive rack 34 and the bottom of bracket 135 is secured to the end of piston rod 136 extending out of cylinder 137. On the other end of rod 136, inside the cylinder 137, is attached a piston 139 which is confined to move on the inner surface of cylinder 137. Input lines 30a and 30b supply the fluid to drive the piston 139 and consequently the drive rack 34, back and forth. Referring back to Fig. 6, rack 34, in turn, drives pinion 35 to thereby cause the work spindle 36 journaled in bearings 79 and 80 to rotate about its axis for as much as two revolutions in one direction and then the other. Workpiece W is held on an arbor 81 which is connected at one end via an indexing mechanism 95 to work spindle 36. The other end of arbor 81 is supported by tailstock 87 in a conventional manner. On work spindle 36 is second pinion 40 which engages cam rack 39 rigidly attached to the underside of a cam support 41. Cam support 41 slidably rests upon a cam way 45 attached to the bed frame 10. Held at an angle relative to the lengthwise dimension of the cam support 41 (see Fig. 7) is cam H. This cam H is positioned so as to provide the desired helical path, i.e., horizontal movement of the cutter T along the axis of rotation of the workpiece W for a given rotational setting of the work spindle 36. The pedestal 12 which is rigidly mounted on top of the bed frame 10 has vertical ways 82 and 83 on which the carriage 14 is mounted for up and down movements. The sub-carriage 15 is then mounted on ways 86a and 86b (see Fig. 8) provided on the carriage 14 for horizontal movement relative to the carriage 14 in a direction parallel to the axis of rotation of the work spindle 36. Depending beneath sub-carriage 15 are supports 43a and 43b for cam followers 44a and 44b, respectively, each of which is independently controlled to engage the side controlling surfaces of the cam H. Thus as shown in Fig. 6, the movement of sub-carriage 15 is seen to be controlled by the side surface of cam H engaging follower 44a. The follower 44b is shown moved out by adjusting screw 88b so as to be ineffective. In order to hold the follower 44a against the right side surface of cam H, such that subcarriage 15 is moved in accordance with this surface of the cam H, air pressure is directed into an opening 90 (see Fig. 8) provided in carriage 14. This pressure forces the end of a rod 90a located in a bore 91 provided in carriage 14 to bear against a vertical surface 103 on sub-carriage 15. A similar arrangement for holding sub-carriage 15 so as to move in accordance with the follower 44b on the left side surface of cam H is provided by inlet 92 which provides air into a bore 93 provided on the opposite side of carriage 14 (Fig. 8).

Mounted on the outward extension 18 of the sub-carriage 15 by means of a bracket portion 23 is cutter spindle housing 19. Within housing 19 is a sleeve 100 which slidably engages the inner walls thereof. The cutter spindle 20a is rotatably mounted in bearings 114 and 115 provided on the inner surface of sleeve 100. On the upper end of a belt guard 120 which is attached to the top of sleeve 100, follower 49 is provided for riding against the contoured control surface of vertical cam V. Cam V is rigidly fixed to carriage 14 by screws 94a and 94b. It should now be understood that sleeve 100 is forced upwardly by compressed air applied at inlet 27 provided on the side of housing 19. This air pressure exerts a force on a flange 25 provided on the lower end of sleeve 100. It should be further noted that the cutter spindle housing 19 can be repositioned, by loosening the bolts 122 and 123 holding the bracket portion 23 thereof, along the circular slot 24 provided on the lateral surface of extension 18. In this way the rotating axis of cutter T can be disposed so as to be at an angle other than perpendicular to the rotating axis of the work spindle 36. It is in this way that the blades of the impeller can be generated such that the sides are at any desired angle relative to the rotating axis of the impeller, as shown in Fig. 2.

It should now be clear that the handwheel 16 can be rotated such that the entire carriage 14, including the sub-carriage 15 attached thereto, can be moved upwardly or downwardly so as to move the path of cutter T radially relative to the workpiece W. This arises from the fact that cam V is attached to carriage 14 and cutter T is positioned to follow a path determined by the follower 49 on the contoured surface of cam V. The vertical height of cam H is shown to be of substantial dimension to provide contact with the followers 44a or 44b for the full vertical movement required of the carriage 14 during the cutting of an impeller.

Located on work spindle 36 opposite the drive pinion 35 is an indexing mechanism 95. In order to cut each successive circumferentially positioned vane, such as vanes 52 and 53 (Fig. 2), after nut 97 is loosened, so as to free the arbor 81 relative to the work spindle 36, the pin 96 of mechanism 95 must be disengaged and the workpiece W rotated the desired amount. Upon the pin 96 engaging the desired hole in the member 98, the nut 97 is again tightened and the machine is then ready to cut the next vane. It should be noted that the indexing mechanism 95 can be operated, independently of the settings provided, by handwheel 99b (see Fig. 5) which rotates worm 99a engaging member 98.

The arrangement of the cam H for controlling the horizontal movement of the sub-carriage 15 and subsequently the cutter T can be more clearly seen by Fig. 7. Here the cam H is shown to be positioned on cam support 41 at an angle relative to the lengthwise dimension thereof. Holes 101 provided on the cam support 41 permit the cam H to be easily positioned, and the setting thereof changed, by merely removing screw 128 and reinserting it in one of the holes 101. The cam way 45 on which the cam support 41 rides is provided with a longitudinal opening 102 for guiding the rack 39 (Fig. 6) secured to the underside of the cam support 41. The support 132 (Fig. 9) provides a bearing surface for the rack 34 driven by the reciprocating motion of the hydraulic drive mechanism 32. The longitudinal opening 133 provides a path for the bracket 135 which connects the rack 34 to the piston rod 136, as described in connection with Figs. 6 and 9.

Also shown in Fig. 7 is a plan view of the automatic feeding mechanism 70 for the carriage 14, which enables the cutter T to incrementally advance radially into the workpiece W. This is accomplished at the end of an oscillatory motion of the workpiece W. Thus, at the instant the piston 139 (Fig. 9) reaches the end of its travel, for example, a valve (not shown) operates to cause cylinder 105 to advance upwardly along rod 105a. Upon arm 104a contacting an upper limit switch 104, this valve reverses, and the movement of cylinder 105 toward the fixed end 103 of rod 105 rotates lever 106 about pivot 107. This causes link 108, rigidly fixed to rotate with lever 106 to push the rod 109 to the left, thus causing lever 110 to rotate about the axis 114 of the feed screw 113 enabling a pawl 112 to engage the teeth 115a of a ratchet wheel 115 keyed to feed screw 113 to thereby rotate the screw 113 a desired amount. Upon arm 104a contacting the lower limit switch 124, the motion of cylinder 105 stops in readiness for movement the next time the piston 139 reaches the end of its travel. The amount of rotation given to the feed screw 113 by an actuation of pawl 112 is determined by the setting of plate 111 which controls when the pawl 112 engages the teeth 115a of the ratchet wheel 115.

In addition to automatically controlling the feeding mechanism 70, it is possible to adjust the length of the stroke of the reciprocating hydraulic drive mechanism 32 and consequently the amount of rotation imparted to the work spindle 36 during each of its oscillations. Thus as shown in Fig. 5, a chain 116 driven by a pinion 117 provided on the work spindle 36 connects to a stroke adjusting mechanism 121 provided on the front of the pedestal 12. By setting the arms 118, 119 of the adjustment, it is possible to control the operation of the solenoids (not shown) which open the forward and reverse valves for feeding fluid into inlets 30a and 30b of the hydraulic drive mechanism 32 (Fig. 9).

The scope of the present invention is intended to be defined by the appended claims and not to be limited to the construction and arrangements of parts illustrated since it is recognized that equivalent devices are known which, when substituted for the specific structure shown, will perform the same functions in substantially the same way.

What is claimed is:

1. A machine for generating vanes on an impeller comprising: a work spindle journaled for supporting a workpiece for rotation on a horizontal axis; a first pinion on said work spindle; a first rack disposed to move transversely of the horizontal axis of said work spindle in engagement with said first pinion; reciprocating driving means for driving said first rack back and forth to cause said work spindle to rotate on said horizontal axis in one direction and then the other; a second pinion on said work spindle; a second rack horizontally disposed and engaged to be driven by said second pinion transversely of the axis of rotation of said work spindle; a drive cam attached to move with said second rack, said drive cam having a side control surface extending along the direction of movement thereof; a cutter spindle carrying a cutter; a sleeve member rotatably supporting said cutter spindle; a housing in which said sleeve member is supported for movement toward and from the axis of rotation of said workpiece; means for rotating said cutter spindle in said sleeve member irrespective of the position of said sleeve member in said housing; a support having ways along which said housing is confined to move in a direction parallel to the axis of rotation of said workpiece; a stationary cam fixed to said support, said stationary cam extending in a direction generally parallel to the axis of rotation of said workpiece and provided with a linear control surface along the edge thereof; a first cam follower connected to said housing and disposed to engage and to be driven by the side control surface of said drive cam to thereby effect the movement of said housing along the ways of said support; and a second cam follower connected to said sleeve member and disposed to engage and ride along the control surface of said stationary cam to thereby effect the movement of said sleeve member in said housing upon said housing being driven along the ways of said support by engagement of said first cam follower with the side control surface of said drive cam.

2. A machine for forming helically disposed vanes on an impeller comprising: a base; a work spindle journaled on said base and adapted to concentrically mount an impeller workpiece for rotation on a horizontal axis; a first pinion on said work spindle; a first rack disposed for movement transversely of the horizontal axis of said work spindle in engagement with said first pinion; a reciprocating driving means for driving said first rack back and forth to cause said work spindle to rotate on said horizontal axis as much as two revolutions in one direction and then the other; a second pinion on said work spindle; a second rack horizontally disposed and engaged to be driven by said second pinion transversely of the axis of rotation of said work spindle; a rectilinear drive cam disposed on said second rack and attached to move therewith, said drive cam having a side control surface with a substantially large vertical dimension; a cutter spindle carrying a cutter; a sleeve member rotatably supporting said cutter; a housing in which said sleeve member is supported for movement toward and from the axis of rotation of said workpiece; means for rotating said cutter spindle in said sleeve member irrespective of the position of said sleeve member in said housing; a carriage supported by said base for vertical movement relative thereto, said carriage having ways along which said housing is confined to move in a direction parallel to the axis of rotation of said work spindle; a stationary cam fixed to said carriage and extending in a direction generally parallel to the direction of movement of said housing relative to said carriage, said stationary cam provided with a linear control surface along the length thereof; a first cam follower connected to said housing and disposed to be horizontally driven by the control surface of said drive cam to effect the movement of said housing along the ways of said carriage; a second cam follower connected to said sleeve member and disposed to engage and be moved past the control surface of said stationary cam to effect the movement of said sleeve member in said housing upon said housing being horizontally driven along the ways of said carriage by engagement of said first cam follower with the control surface of said drive cam; and means for incrementally advancing said carriage vertically on said base at the end of each stroke of said reciprocating driving means to thereby cause said first cam follower connected to said housing to engage and thereby be driven by a different vertical portion of the side control surface of said drive cam.

References Cited in the file of this patent

UNITED STATES PATENTS

| | | |
|---|---|---|
| 2,645,161 | Stuart et al. | July 14, 1953 |
| 2,660,930 | De Vlieg et al. | Dec. 1, 1953 |
| 2,660,931 | De Vlieg | Dec. 1, 1953 |